US008472666B2

(12) United States Patent
Takehiko

(10) Patent No.: US 8,472,666 B2
(45) Date of Patent: Jun. 25, 2013

(54) ELECTRONIC APPARATUS WITH ANGLE-ADJUSTABLE OPERATION PANEL

(75) Inventor: Asano Takehiko, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 957 days.

(21) Appl. No.: 12/557,949

(22) Filed: Sep. 11, 2009

(65) Prior Publication Data

US 2010/0165382 A1  Jul. 1, 2010

(30) Foreign Application Priority Data

Dec. 25, 2008 (JP) ................................ 2008-330872

(51) Int. Cl.
*G06K 9/00* (2006.01)
(52) U.S. Cl.
USPC ............. 382/103; 382/118; 345/158; 725/12; 340/540; 340/541; 340/571
(58) Field of Classification Search
None
See application file for complete search history.

(56) References Cited

U.S. PATENT DOCUMENTS

| | | | |
|---|---|---|---|
| 6,591,064 B2 * | 7/2003 | Higashiyama et al. | 396/18 |
| 7,827,412 B2 * | 11/2010 | Matsumoto | 713/186 |
| 8,031,272 B2 * | 10/2011 | Blatchley et al. | 348/836 |
| 8,035,840 B2 * | 10/2011 | Mizutani et al. | 358/1.15 |
| 8,115,877 B2 * | 2/2012 | Blatchley et al. | 348/836 |
| 2003/0021598 A1 * | 1/2003 | Higashiyama et al. | 396/18 |
| 2007/0055648 A1 * | 3/2007 | Matsumoto | 707/2 |
| 2007/0059032 A1 | 3/2007 | Yamada et al. | |
| 2008/0240519 A1 * | 10/2008 | Nagamitsu | 382/118 |
| 2009/0025022 A1 * | 1/2009 | Blatchley et al. | 725/9 |
| 2009/0174658 A1 * | 7/2009 | Blatchley et al. | 345/158 |
| 2009/0210927 A1 * | 8/2009 | Mokuya et al. | 726/3 |

FOREIGN PATENT DOCUMENTS

| | | |
|---|---|---|
| JP | 09-091495 | 4/1997 |
| JP | 2005-060087 | 3/2005 |
| JP | 2005-153308 | 6/2005 |
| JP | 2006-058693 | 3/2006 |
| JP | 2006-093934 | 4/2006 |
| JP | 2006-344100 | 12/2006 |
| JP | 2007-245414 | 9/2007 |
| JP | 2007-280291 | 10/2007 |

* cited by examiner

*Primary Examiner* — Matthew Bella
*Assistant Examiner* — Jason Heidemann
(74) *Attorney, Agent, or Firm* — Frommer Lawrence & Haug LLP

(57) ABSTRACT

An electronic apparatus may include an operation panel, a driving device, an image pickup device, a face detection unit, and a control unit. The operation panel may be configured to move. The driving device may be configured to move the operation panel. The image pickup device may be configured to be installed proximate the operation panel, and/or to capture an image of a user. The face detection unit may be configured to detect a position of a facial image of the user within the image captured by the image pickup device. The control unit may be configured to control the driving device such that the operation panel and an optical axis of the image pickup device move according to the position of the facial image detected by the face detecting unit.

16 Claims, 13 Drawing Sheets

(A)

(B)

(C)

(A)

(B)

ELECTRONIC APPARATUS WITH ANGLE-ADJUSTABLE OPERATION PANEL

INCORPORATION BY REFERENCE

This application is based upon and claims the benefit of priority from the corresponding Japanese Patent Application No. 2008-330872, filed Dec. 25, 2008, the entire contents of which is incorporated herein by reference

FIELD OF THE INVENTION

The present invention relates to an electronic apparatus.

BACKGROUND OF THE INVENTION

Typical electronic apparatuses are provided with an operation panel for detecting a user's operation. On some electronic apparatuses having an operation panel, an inclination angle thereof can be adjusted manually or electrically.

If the electronic apparatus is used by a plurality of users, a reasonable inclination angle of the operation panel varies from user to user. This is because a position of a face changes depending upon a height of the user. Therefore, each of the users using the electronic apparatus is required to manually adjust the inclination angle of the operation panel according to his/her height.

SUMMARY OF THE INVENTION

An electronic apparatus according to an embodiment of the present invention comprises an operation panel, a driving device, an image pickup device, a face detection unit, and a control unit. The operation panel is configured to move. The driving device is configured to move the operation panel. The image pickup device is configured to be installed proximate the operation panel, and to capture an image of a user. The face detection unit is configured to detect a position of a facial image of the user within the image of the user captured by the image pickup device. The control unit is configured to control the driving device such that operation panel and an optical axis of the image pickup device move according to the position of the facial image detected by the face detection unit.

According to embodiments of the present invention, it is possible to provide an electronic apparatus capable of automatically setting the operation panel at the reasonable inclination angle suitable for the user.

The above and other objects, features, and advantages of the present invention will be more apparent from the following detailed description of embodiments taken in conjunction with the accompanying drawings.

In this text, the terms "comprising", "comprise", "comprises" and other forms of "comprise" can have the meaning ascribed to these terms in U.S. Patent Law and can mean "including", "include", "includes" and other forms of "include".

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which exemplary embodiments of the invention are illustrated in the accompanying drawings in which corresponding components are identified by the same reference numerals.

BRIEF DESCRIPTION OF THE DRAWINGS

The following detailed description, given by way of example, but not intended to limit the invention solely to the specific embodiments described, may best be understood in conjunction with the accompanying drawings, in which.

DETAILED DESCRIPTION OF THE EMBODIMENTS

Reference will now be made in detail to various embodiments of the invention, one or more examples of which are illustrated in the accompanying drawings. Each example is provided by way of explanation of the invention, and by no way limiting the present invention. In fact, it will be apparent to those skilled in the art that various modifications, combinations, additions, deletions and variations can be made in the present invention without departing from the scope or spirit of the present invention. For instance, features illustrated or described as part of one embodiment can be used in another embodiment to yield a still further embodiment. It is intended that the present invention covers such modifications, combinations, additions, deletions, applications and variations that come within the scope of the appended claims and their equivalents.

Figure 1:
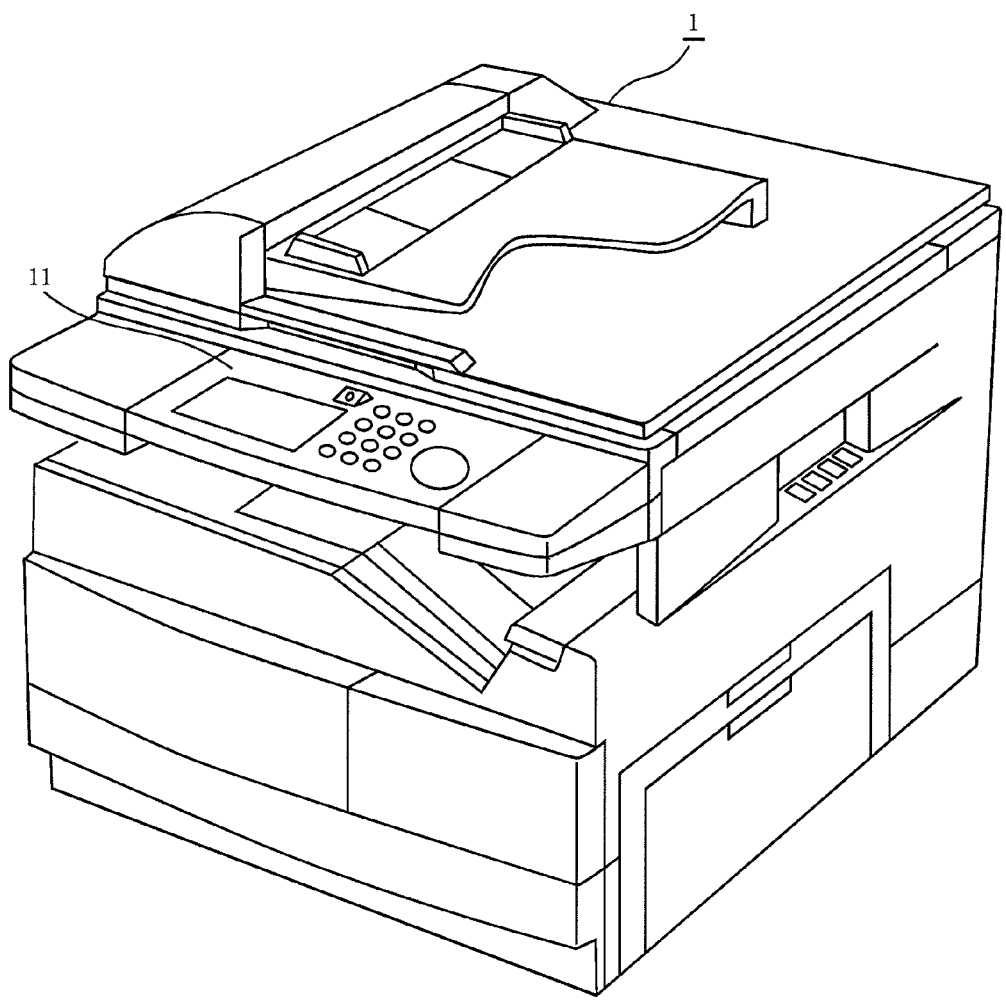
FIG. 1 illustrates a perspective view of an electronic apparatus according to a first embodiment of the present invention.

FIG. 1 illustrates a perspective view of an electronic apparatus according to an embodiment of the present invention. As shown in FIG. 1, electronic apparatus 1 is a copier which includes operation panel 11. Operation panel 11 may be provided with one or more input devices which may be operated by a user. In some embodiments, an electronic apparatus may be any electronic apparatus having an operational panel.

Figure 2:
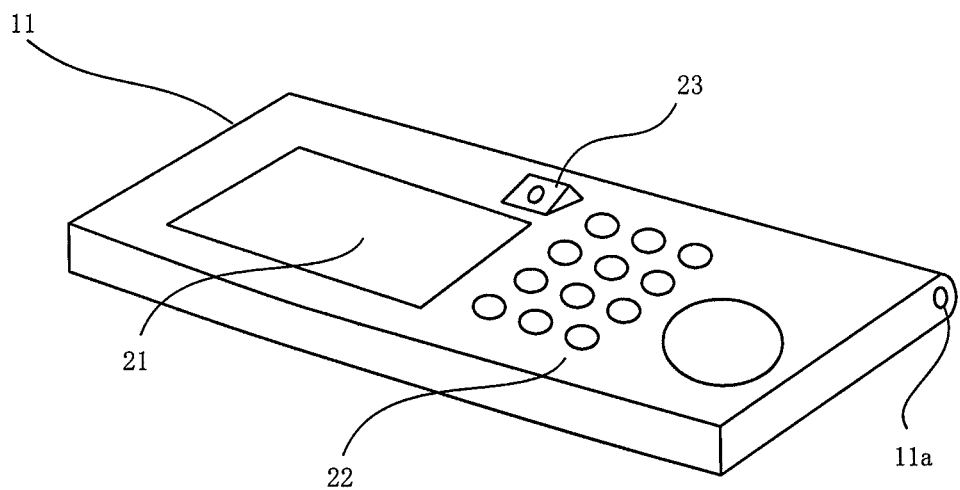
FIG. 2 illustrates a perspective view of an operation panel of the electronic apparatus illustrated in FIG. 1.

FIG. 2 depicts a perspective view of operation panel 11 of the electronic apparatus illustrated in FIG. 1. In this illustrative embodiment, display device 21, input device 22, and image pickup device 23 disposed for interfacing with the user (e.g., access by or image capture of a user) via a common surface of operation panel 11. In some embodiments, an operational panel may include any combination of input devices, image pickup devices and/or display devices. For example, an operation panel may include multiple input devices, multiple display devices and at least one image pickup device.

Figure 3:
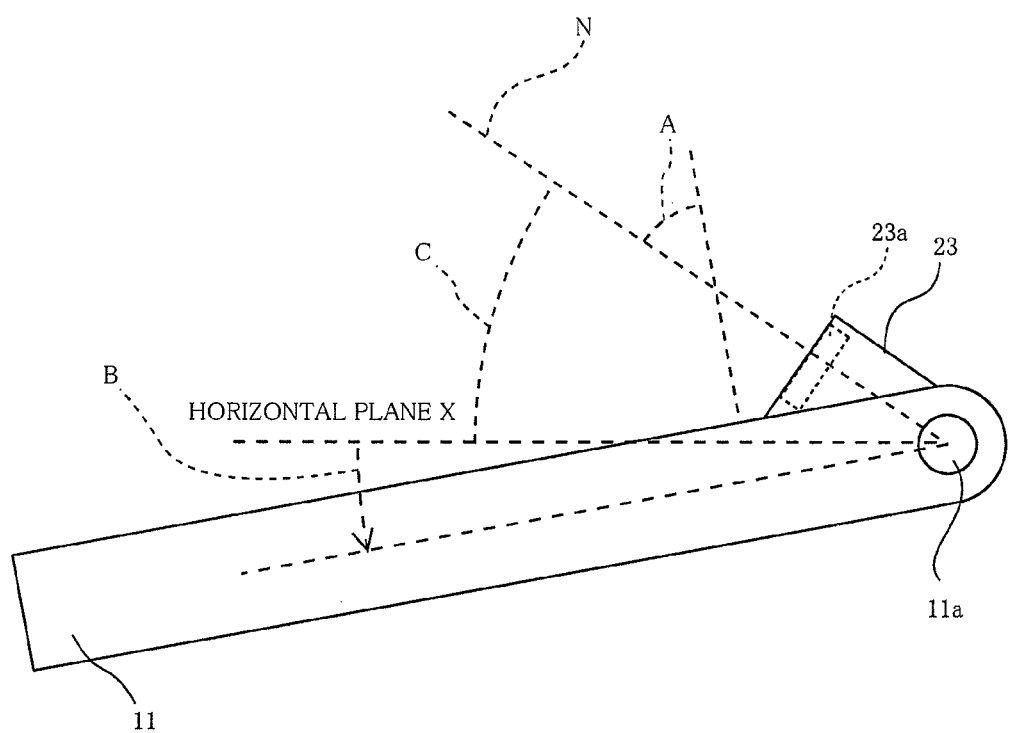
FIG. 3 illustrates a side view of the operation panel of the electronic apparatus illustrated in FIG. 1.

FIG. 3 shows a side view of operation panel 11 of electronic apparatus 1 illustrated in FIG. 1. Operation panel 11 is coupled to electronic apparatus 1 such that the operational panel may pivot about horizontal pivotal shaft 11a. As shown in FIG. 3, inclination angle B of operation panel 11 can be changed by applying torque to pivotal shaft 11a via a transmission mechanism (not shown; e.g., one or more gears, belts, and/or other couplings) by driving device 31 (shown in FIG. 4) having a motor or the like. Here, inclination angle B represents an angle formed between operation panel 11 and horizontal plane X shown in FIG. 3.

Display device 21 displays a screen for performing setting for an operation of electronic apparatus 1, and the like. Display devices may include output devices including, but not limited to display panels, liquid crystal displays, LED displays, nanocrystal displays and/or any displays known in the art.

As shown in FIG. 2, input device 22 may detect a user's input and/or operation. In some embodiments, the input device may output an electrical signal corresponding to the user's input and/or operation. An input device may include any peripheral used to provide data. Input devices may include, but are not limited to keyboards, key switches, touch panels, light pens, trackballs, mice, joysticks, microphones, card readers such as smart card readers, integrated circuit card (hereinafter "IC card") readers, or chip card readers, and/or any input devices known in the art. In some embodiments, the display device may also be used as the input device. For example, when the input device is a touch panel, the display device may also be the input device. In some embodiments, input device 22 may include an IC card reader. In that case, the IC card reader reads various kinds of information from a user's IC card.

FIG. 3 depicts image pickup device 23 having optical system 23a. In some embodiments, the optical system may include a lens and an image pickup element, such as a charge coupled device (hereinafter "CCD") or a complimentary metal oxide semiconductor (hereinafter "CMOS") sensor. Image pickup device 23 may output a picked-up image as image data. As illustrated in FIG. 3, optical axis N of image pickup device 23 may be inclined by a predetermined angle. For example, FIG. 3 shows optical axis N of image pickup device 23 at angle A relative to a direction perpendicular to the surface of operation panel 11. Further, optical axis N of image pickup device 23 exists in a radial direction (or substantially in a radial direction) about pivotal shaft 11a of operation panel 11. In other words, a direct extension of optical axis N of image pickup device 23 passes pivotal shaft 11a or a vicinity thereof.

Figure 4:
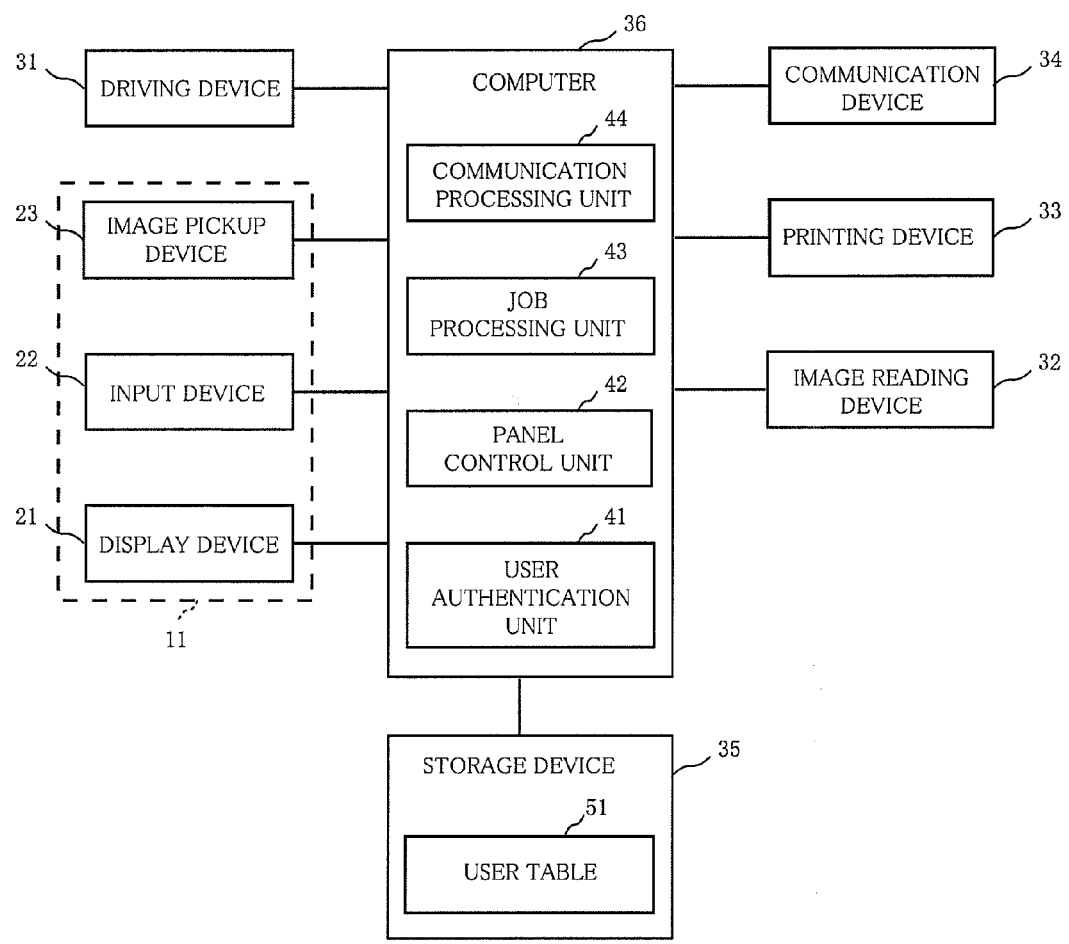
FIG. 4 illustrates a block diagram representing an electrical configuration of the electronic apparatus illustrated in FIG. 1.

FIG. 4 depicts a block diagram representing a configuration of electronic apparatus 1 illustrated in FIG. 1. Driving device 31 may be used to change inclination angle B (shown in FIG. 3) by pivoting operation panel 11 about pivotal shaft 11a. Driving device 31 may include a driving source, such as a motor, and may apply torque to pivotal shaft 11a of operation panel 11 (shown in FIG. 3) via the transmission mechanism (not shown).

As shown in the block diagram depicted in FIG. 4, storage device 35 may store data used in processing performed by computer 36. Examples of storage device 35 used include a hard disk drive and a nonvolatile semiconductor memory. In an embodiment, storage device 35 stores user table 51. User table 51 may include user identification information (e.g., an ID and/or a password) and/or user-related information on a per user basis.

Image reading device 32 may optically read an original image to generate image data.

Printing device 33 may print an image based on print data.

Communication device 34 may be connected to a communication network, such as a computer network, and performs data communications with another device connected to the communication network.

Figure 5:
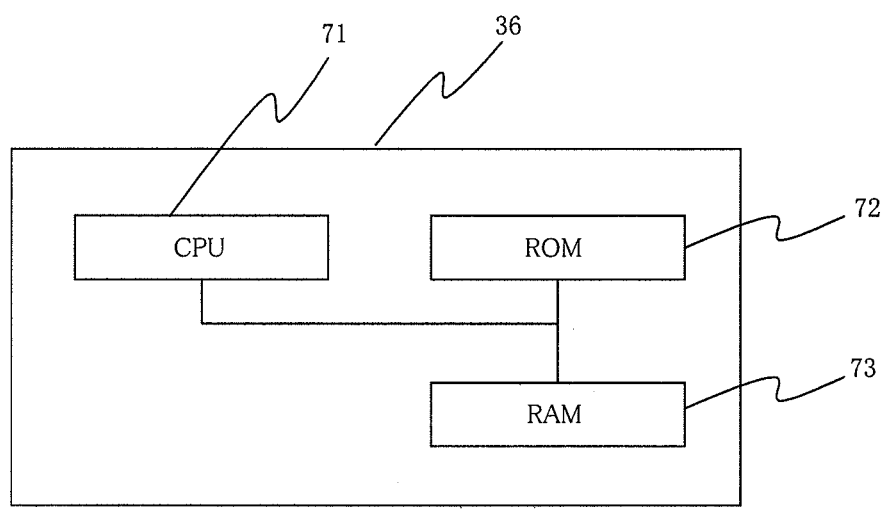
FIG. 5 illustrates a hardware architecture of the computer illustrated in FIG. 4.

Computer 36 receives a signal from each of the devices included in electronic apparatus 1, and based on the signal, performs various kinds of processing. In some embodiments, the computer may control each of the devices included in the electronic apparatus. As illustrated in FIG. 5, computer 36 is configured as, for example, a control board including central processing unit (hereinafter "CPU") 71, read only memory (hereinafter "ROM") 72, random access memory (hereinafter "RAM") 73, and the like. CPU 71 includes an arithmetic processing unit that executes a processing described in a program. ROM 72 is a nonvolatile memory in which a program and data may be stored in advance. RAM 73 is a memory that may temporarily store the program and the data upon execution of the program, which is used as a work area.

CPU 71 may function as various kinds of processing units by execution of the program stored in ROM 72. To be specific, in some embodiments CPU 71 may function as user authentication unit 41, panel control unit 42, job processing unit 43, communication processing unit 44 and/or any combination thereof.

User authentication unit 41 may determine whether or not the user identification information that matches the user identification information detected by input device 22 is registered in user table 51. When the user identification information is registered in user table 51, user authentication unit 41 identifies a logged-in user, and permits the logged-in user to use electronic apparatus 1. On the other hand, when the user identification information is not registered in user table 51, user authentication unit 41 does not permit the logged-in user to use electronic apparatus 1.

As shown in FIG. 4, panel control unit 42 may include a face detection function of detecting a position of a facial image within an image of the user picked up by image pickup device 23. In some embodiments, panel control unit 42 may include a panel control function of controlling driving device 31 to pivot the optical axis of image pickup device 23 and operation panel 11 according to the detected position of the facial image. Note that, for detection of the facial image, known technologies disclosed in Japanese Patent Application Laid-Open No. 2006-344100, Japanese Patent Application Laid-Open No. 2006-93934, and the like can be used. Both Japanese Patent Application Laid-Open No. 2006-344100 and Japanese Patent Application Laid-Open No. 2006-93934 are hereby incorporated by reference in their entirety.

As shown in FIG. 4, job processing unit 43 generates print data from the image data generated by image reading device 32, and causes printing device 33 to print the original image based on the print data.

Communication processing unit 44 controls communication device 34 to transmit data to another device.

Figure 6:
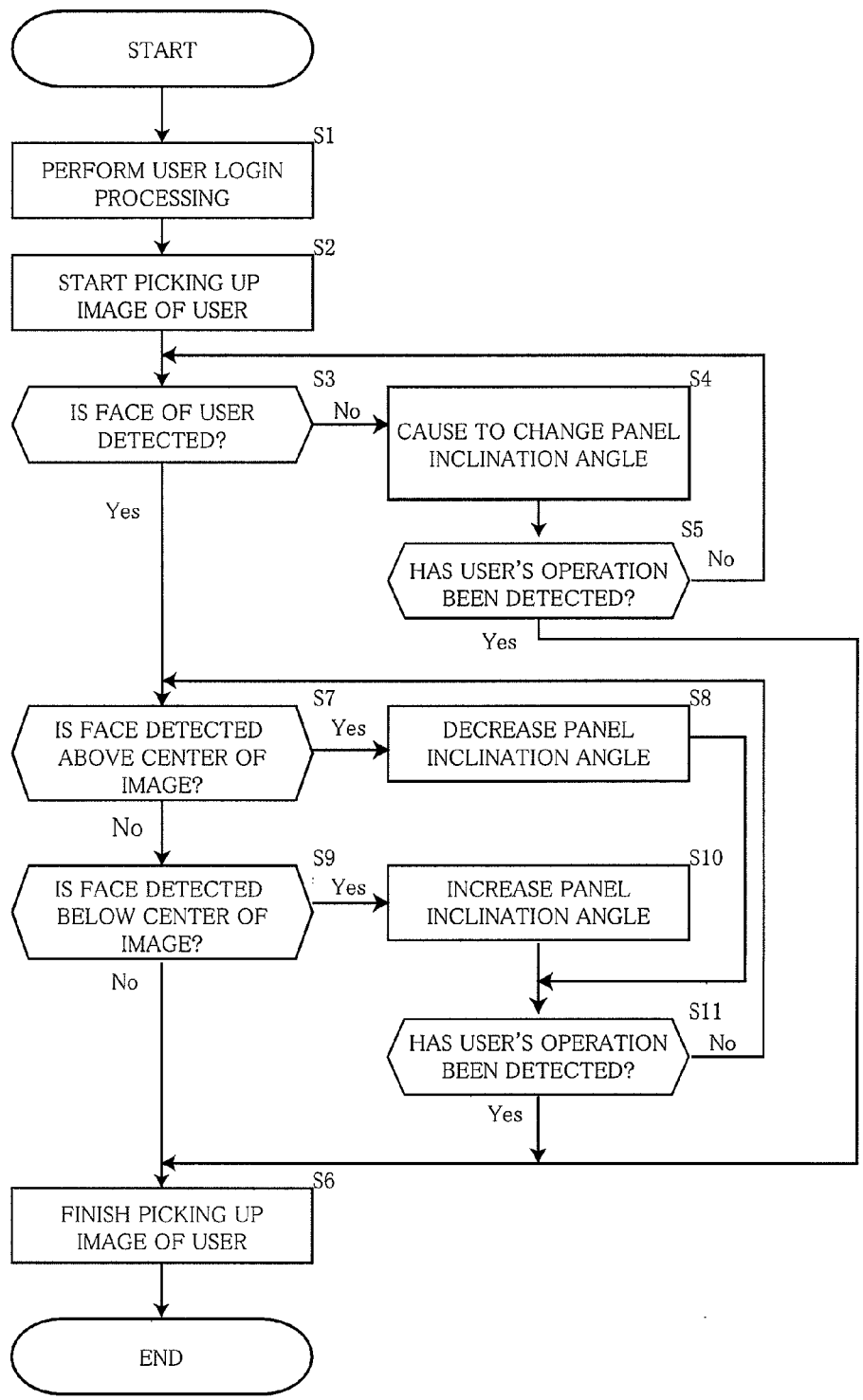
FIG. 6 illustrates a flowchart for describing an operation of the electronic apparatus illustrated in FIG. 1.

Described next are some embodiments of operating electronic apparatus 1. FIG. 6 depicts an illustrative flowchart for describing the operation of an electronic apparatus such as electronic apparatus 1 illustrated in FIG. 1.

As shown in FIG. 6, when the user identification information is input to the input device by the user, the user authentication unit references the user table to determine whether or not to permit the user to log in (Step S1).

When the user is permitted to log in, the panel control unit controls the image pickup device to start to capture the image of the user (Step S2). Accordingly, until an end of image pickup, the image data of a static image is repeatedly generated (e.g., periodically) by image pickup device.

The panel control unit 42 may control the driving device and thus, the movement of the operation panel. For example, the panel control unit may allow the driving device to position operational panel 11 (shown in FIG. 3) such that inclination angle B may be set to a predetermined initial value. In Step S3 of FIG. 6, the panel control unit may determine whether or not the facial image exists within the image obtained by the image pickup device.

When the facial image does not appear within the image obtained by the image pickup device, the panel control unit controls the driving device such that the inclination angle B changes until the facial image is detected in the image obtained by the image pickup device. For example, the operation panel may increase or decrease the inclination angle B until the facial image is detected within the image obtained by the image pickup device (Steps S3 and S4). In some embodiments, a direction of movement of the operation panel may be predetermined. When the facial image is not detected even after the inclination angle B is adjusted to a limit of a predetermined angular range, the panel control unit may cause the driving device to move the operation panel in an inverse direction. Note that during this time, if the user's operation with respect to the input device is detected as shown in Step S5 of FIG. 6, the image pickup unit ends picking up the image of the user (i.e., Step S6), and the panel control unit stops the adjustment of inclination angle B.

When the facial image is detected within the image obtained by the image pickup device, the panel control unit may cause the driving device to temporarily stop the operation panel at the inclination angle B. Then, the panel control unit may determine whether or not the facial image is detected above a center of the image within the image obtained by the image pickup device (i.e., Step S7 of FIG. 6). In some embodiments, the predetermined location of the facial image may correspond to a position where the nose is positioned near a center of the facial image.

When the facial image is detected above the center of the image, the panel control unit may control the driving device such that the inclination angle B of the operation panel is decreased (i.e., Step S8). The amount of change in the inclination angle B, may be determined according to a distance between a detected position of the facial image and the center of the image along a pivotal direction of the operation panel (hereinafter, referred to as "pivotal direction").

On the other hand, when the facial image is not detected above the center of the image, the panel control unit may determine whether or not the facial image is detected below the center of the image within the image obtained by the image pickup device (i.e., Step S9 of FIG. 6). When the facial image is detected below the center of the image, the panel control unit may allow the driving device to increase the inclination angle B of the operation panel (i.e., Step S10 of FIG. 6). An increase in the inclination angle B may be determined according to a distance between the detected position of the facial image and the center of the image along the pivotal direction.

As shown in FIG. 6, Steps S7 to S10 may be repeated until the facial image is detected at the center of the image in the pivotal direction. Note that during this time (i.e., while the panel inclination angle is being adjusted until the facial image is centered), if the user's operation with respect to the input device has been detected (i.e., Step S11), then the image pickup unit ends picking up the image of the user (i.e., Step S6), and the panel control unit stops adjusting the inclination angle B of the panel control unit.

Figure 7:
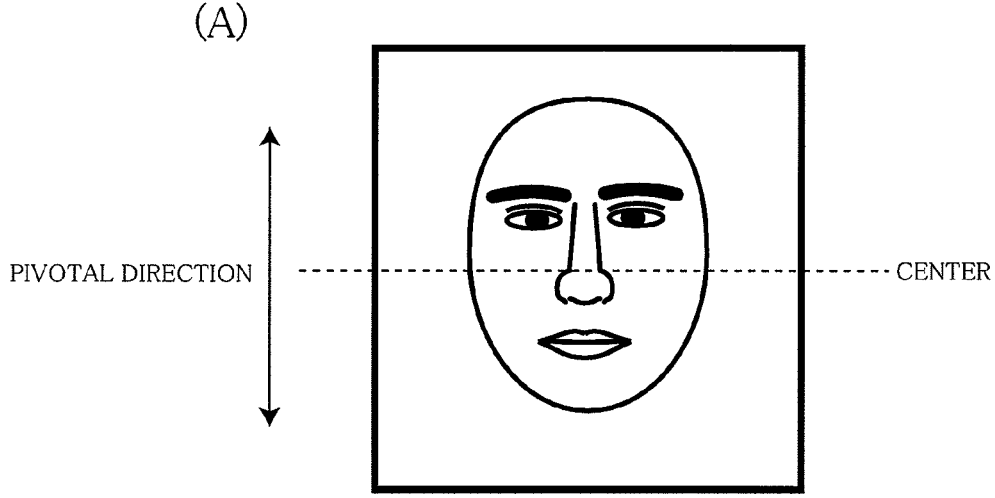
FIGS. 7A to 7C illustrate examples of a facial image within an image obtained by an image pickup device in the first embodiment.
Figure 7:
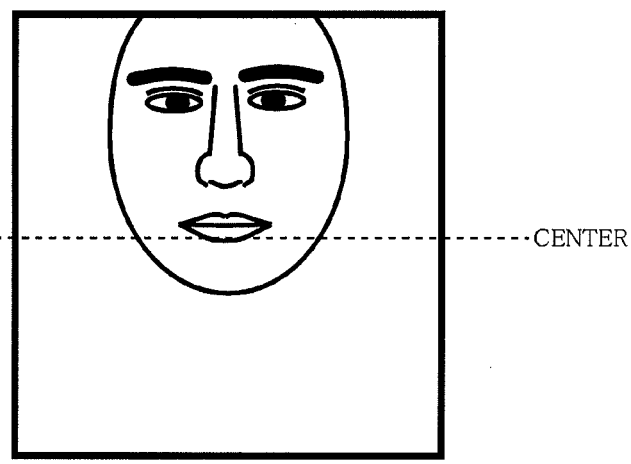
Figure 7:
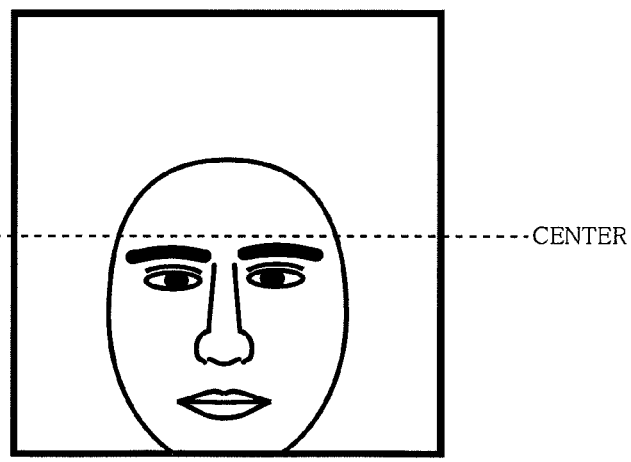

FIGS. 7A to 7C illustrate examples of the facial image within the image obtained by the image pickup device in an embodiment such as when an electronic apparatus is operated in accordance in accordance with FIG. 6. In the examples, a nose within the facial image is a representative point. When the representative point is detected above the center of the image as illustrated in FIG. 7B, the panel control unit may control driving device 31 such that inclination angle B of operation panel 11 (Step S8) is decreased. On the other hand, when the representative point is detected below the center of the image as illustrated in FIG. 7C, panel control unit 42 may control driving device 31 such that inclination angle B of operation panel 11 (Step S10) increases. These adjustments, as outlined in Steps S7 to S10 of FIG. 6 are repeated until the facial image is detected at the center of the image in the pivotal direction as illustrated in FIG. 7A.

When the facial image is detected at the center of the image in the pivotal direction, the panel control unit may cause the image pickup device to stop picking up the image of the user (Step S6). In some embodiments, the panel control unit may stop adjusting inclination angle B after determining that the facial image is detected at the center of the image captured by the image pickup device.

As shown in FIG. 3, inclination angle B of operation panel 11 corresponding to the position where the facial image is positioned at the center of the image picked up by the image pickup device 23 is recognized as a reasonable inclination angle suitable for the user. In this position, angle C is formed between optical axis N and horizontal plane X. In some embodiments, inclination angle B at this time may be expressed as B=90-A-C (degrees). If the height of the user is large, angle C, formed between optical axis N and plane X when the facial image is detected at the center of the image, becomes large, and hence inclination angle B becomes small. In some embodiments, when the height of the user is small, angle C, formed between optical axis N and plane X when the facial image is detected at the center of the image, becomes small, and hence inclination angle B becomes large.

In some embodiments, there may be a predetermined allowable range considered acceptable for the position of the facial image in the image. For example, the facial image may be detected at the center of the image in the pivotal direction when the facial image exists within a predetermined allowable range in the vicinity of the center of the image. Further, in some embodiments the allowable range may vary according to a size (for example, a length in the pivotal direction) of the facial image.

As described herein, an electronic apparatus according to some embodiments may include, but is not limited to: an operation panel capable of changing the inclination angle B thereof; a driving device that changes the inclination angle B of the operation panel; an image pickup device coupled to (e.g., installed on or in) the operation panel and which is operable to capture the image of the user; and a panel control unit that controls, when the position of the facial image is detected within the image of the user picked up by the image pickup device, the driving device to pivot the operation panel and the optical axis N of the image pickup device according to the position on the facial image.

In some embodiments, the inclination angle of the operation panel may be adjusted for users of varying heights. For example, the inclination angle B of the operation panel can be adjusted according to the position of the face of the user. In some embodiments, the image pickup device may be installed in the operation panel so that the optical axis N of the image pickup device moves in a radial direction about the pivotal shaft of the operation panel. Accordingly, the optical axis N rotates about the pivotal shaft of the operation panel, and hence a change amount of a distance between the user as a subject and the image pickup device becomes small upon the adjustment of the inclination angle B. Thus, a size of the facial image of the user within the image obtained by the image pickup device may hardly be changed. Therefore, it is easy to detect the facial image of the user within the image obtained by the image pickup device.

Further, in some embodiments, optical axis N is inclined by the predetermined angle A from the direction perpendicular to the operation panel toward the front of the operation panel. Therefore, the inclination angle B may be set to be smaller than a case in which the optical axis N extends in the direction perpendicular to the operation panel. In other words, the operation panel is adjusted to be placed toward a slightly upper direction than a case of an inclination angle B that the operation panel is placed directly in front of the face of the user. Accordingly, by inclining the optical axis N by the predetermined angle A, it is possible to automatically set the operation panel at the inclination angle B suitable for the user to operate the input device.

In some embodiments, an electronic apparatus may store properties related to a user. For example, an electronic apparatus may record and/or store the inclination angle B of the operation panel for each user.

Figure 8:
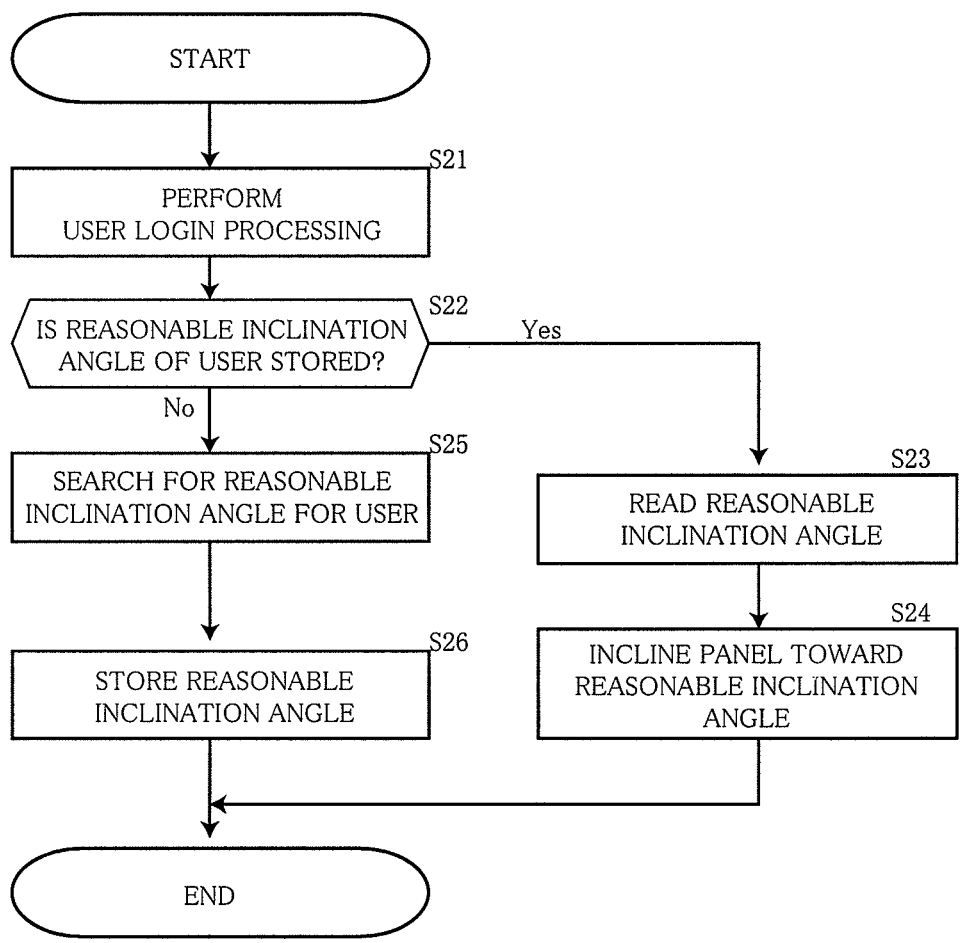
FIG. 8 illustrates a flowchart for describing an operation of an electronic apparatus according to an embodiment.

FIG. 8 depicts a flowchart for describing an operation of an embodiment of an electronic apparatus.

As shown in FIG. 8, when the user identification information is input into the input device by the user in some embodiments, the user authentication unit references the user table to determine whether or not to permit the user to log in (Step S21).

When the user is permitted to log in, the panel control unit determines whether or not reasonable inclination angle data is registered in the user table for the logged-in user (Step S22).

When the reasonable inclination angle data is registered in the user table for the logged-in user, the panel control unit may read the reasonable inclination angle data (Step S23). Subsequently, the panel control unit may control the driving device to set the inclination angle B of the operation panel to the reasonable inclination angle based on the reasonable inclination angle data (Step S24).

In some embodiments, when the reasonable inclination angle data is not registered in the user table for the logged-in user, the panel control unit may search for a reasonable inclination angle of the operation panel for the logged-in user as is depicted in FIG. 8. The panel control unit may place the operation panel at the angle determined (Step S25 of FIG. 8). Then, the panel control unit may register control information, which is necessary for setting the inclination angle B of the operation panel to the currently-measured reasonable inclination angle, in the user table as the reasonable inclination angle data in association with the user identification information for the logged-in user (Step S26).

As described above, an embodiment of an electronic apparatus may include, but is not limited to: a storage device that stores the user identification information; and a user authentication unit that performs a user authentication based on the user identification information upon login. During the user's login, the panel control unit may store the reasonable inclination angle, in other words, the inclination angle B of the time when the position of the facial image becomes a predetermined position, in the storage device as the control information in association with the user identification information of the user. Upon the user's next login, the panel control unit may set the operation panel at the inclination angle B based on the control information.

Accordingly, when the reasonable inclination angle has already been measured, the operation panel is immediately placed at the inclination angle B, and hence it is possible to place the operation panel at the inclination angle B suitable for the logged-in user in a short period of time.

Some embodiments of an electronic apparatus use the facial image, which is picked up upon measurement of the reasonable inclination angle of the operation panel, to simultaneously print the facial image of the user when the user performs an illegal copy. In some embodiments, the electronic apparatus may not perform a login processing. In some embodiments, the electronic apparatus may be configured to be used by an indefinite and large number of users.

In some embodiments, an electronic apparatus may not include the user table as previously described herein. In such embodiments, the panel control unit may store facial image data representing the facial image of the user, which is captured when the operation panel is placed at the reasonable inclination angle, in a storage device. A storage device may include, but is not limited to random-access memory (hereinafter "RAM"), or any other storage known or yet to be discovered in the art.

Some embodiments of the job processing unit may determine whether or not a copy of an original is an illegal copy. This determination may be based on the image data generated by the image reading device. In some embodiments, the job processing unit may generate print data on a print image containing the facial image and the original image based on the facial image data and the image data of the original.

Operation of an embodiment of the electronic apparatus is described below.

Figure 9:
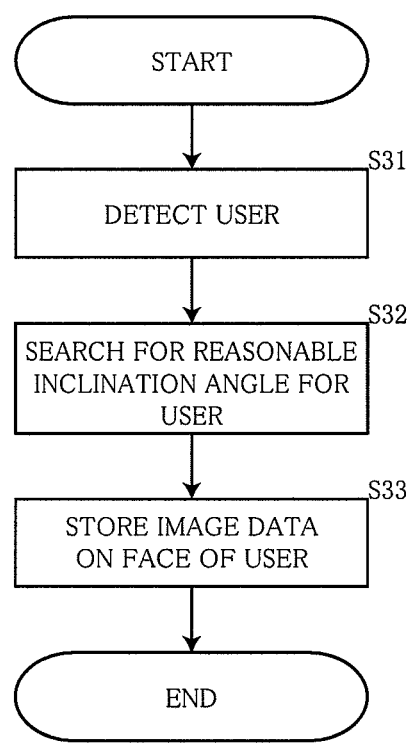
FIG. 9 illustrates a flowchart for describing an inclination angle adjusting processing for an operation panel performed on an electronic apparatus according to a third embodiment.

FIG. 9 depicts a flowchart which describes a process of adjusting the inclination angle of the operation panel. In some embodiments, the process of adjusting the inclination angle B may be performed on the electronic apparatus.

As illustrated in FIG. 9, Step S31 includes detecting the user. The panel control unit may detect the existence of the user using an input device. For example, as shown in FIG. 4, panel control unit 42 may detect the existence of the user using input device 22 (Step S31). Subsequently, the panel control unit may measure the reasonable inclination angle for the user, and control the driving device to place the operation panel at the reasonable inclination angle (Step S32).

Facial image data of the user may be stored by the panel control unit (Step S33). The data stored may correspond to the facial image data taken when a reasonable inclination angle is reached.

In some embodiments, the panel control unit may store the facial image data corresponding to the time when the reasonable inclination angle is reached. For example, when the facial image is located at the center of the image obtained by the image capture device in the storage device. In some embodiments, the facial image data may be stored until the user finishes using the electronic apparatus. Some embodiments of an electronic apparatus may allow for long-term storage of the facial image data.

Figure 10:
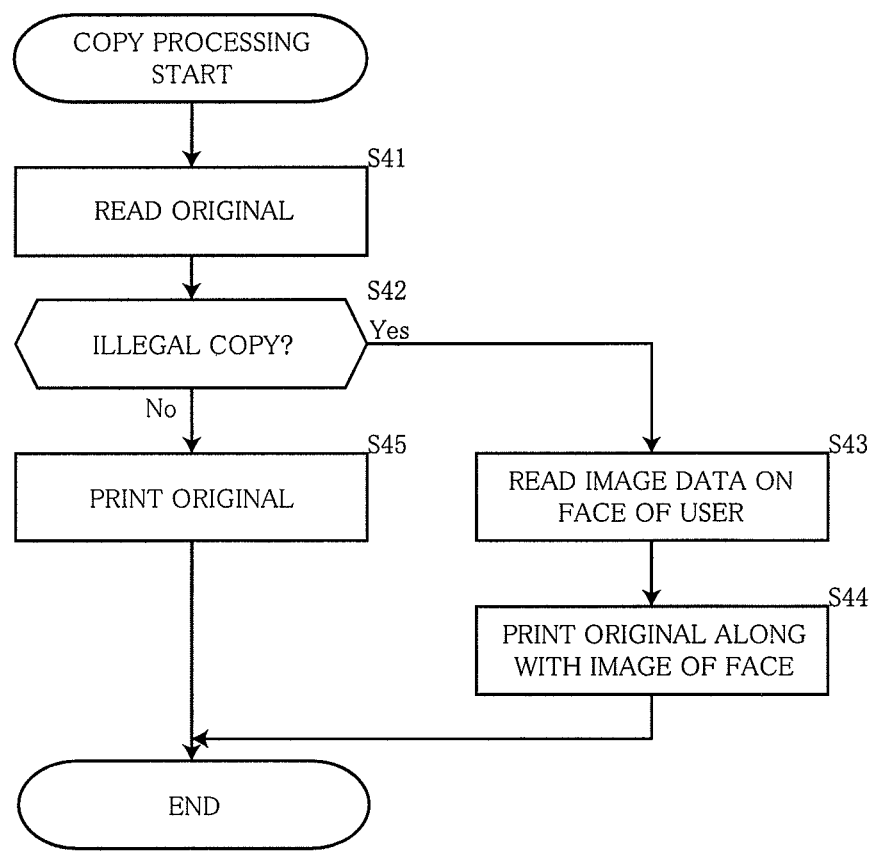
FIG. 10 illustrates a flowchart for describing a copy processing performed on the electronic apparatus according to the third embodiment.

FIG. 10 depicts a flowchart describing the copy processing performed in some embodiments of an electronic apparatus.

The user places an original on the image reading device and engages the input device such that a copy job is executed.

The job processing unit may control the image reading device. The user's input may cause the electronic apparatus to read the original image (Step S41). Accordingly, the image reading device may read the original image, and output the image data on the original image. The image data may be stored temporarily in RAM or another storage device.

In some embodiments, the job processing unit may then read the image data, and may determine whether or not the current copy job involves an illegal copy (Step S42). Examples of an illegal copy may include, but are not limited to currency, checks, bank bills, when use of a predetermined tint block applied by tint blocking printing is detected from the image data, and when it is determined from the image data that duplication of the original is prohibited.

When it is determined that the current copy job involves an illegal copy, the job processing unit may read the facial image data on the current user from storage device, such as RAM or the like (Step S43). Subsequently, based on the facial image data and the image data on the original, the job processing unit may generate the print data on the print image containing the facial image and the original image, and causes the printing device to print an image containing the facial image and the original image (Step S44).

In some embodiments, when it is determined that the current copy job does not involve an illegal copy, the job processing unit may generate the print data on the print image from the original image, and causes the printing device to print the original image (Step S45).

In some embodiments, an electronic apparatus may include, but is not limited to an image reading device, a printing device and a job processing unit. The image reading device may read the original image and generate image data. The printing device may print an image based on the print data. The job processing unit may generate the print data from the image data generated by the image reading device and may cause the printing device to print the original image based on the print data, and then may determine based on the image data whether or not the copy of the original is an illegal copy. The panel control unit may store the facial image data captured by the image pickup device (i.e., image pickup device 23). The image stored by the panel control unit may be captured when the facial image is positioned within the image picked up by the image pickup device at a predetermined location. If the copy of the original is determined to be an illegal copy, the job processing unit may cause the printing device to print the facial image along with the original image based on the stored facial image data.

Thus, in some embodiments it may be possible to suppress an occurrence of an illegal copy. Further embodiments may use the facial image picked up upon detection of the reasonable inclination angle of the operation panel to identify the user who has executed an illegal copy. In an embodiment, the facial image of the user captured upon the measurement of the reasonable inclination angle may be used. The facial image of the user can be printed even if the face of the user is not fully within the viewing angle of the image pickup device when the illegal copy is made. In some embodiments, the facial image data captured by the image pickup device may be stored, and hence it may be easy to obtain a satisfactory facial image from the facial image data.

In an embodiment, the electronic apparatus may be placed in a kiosk, an office, a school or any environment where access to the apparatus is monitored and/or restricted.

An embodiment of an electronic apparatus may use the facial image captured upon the measurement of the reasonable inclination angle of the operation panel to thereby estimate an age of the user, and display a screen that suits the age of the user.

Figure 11:
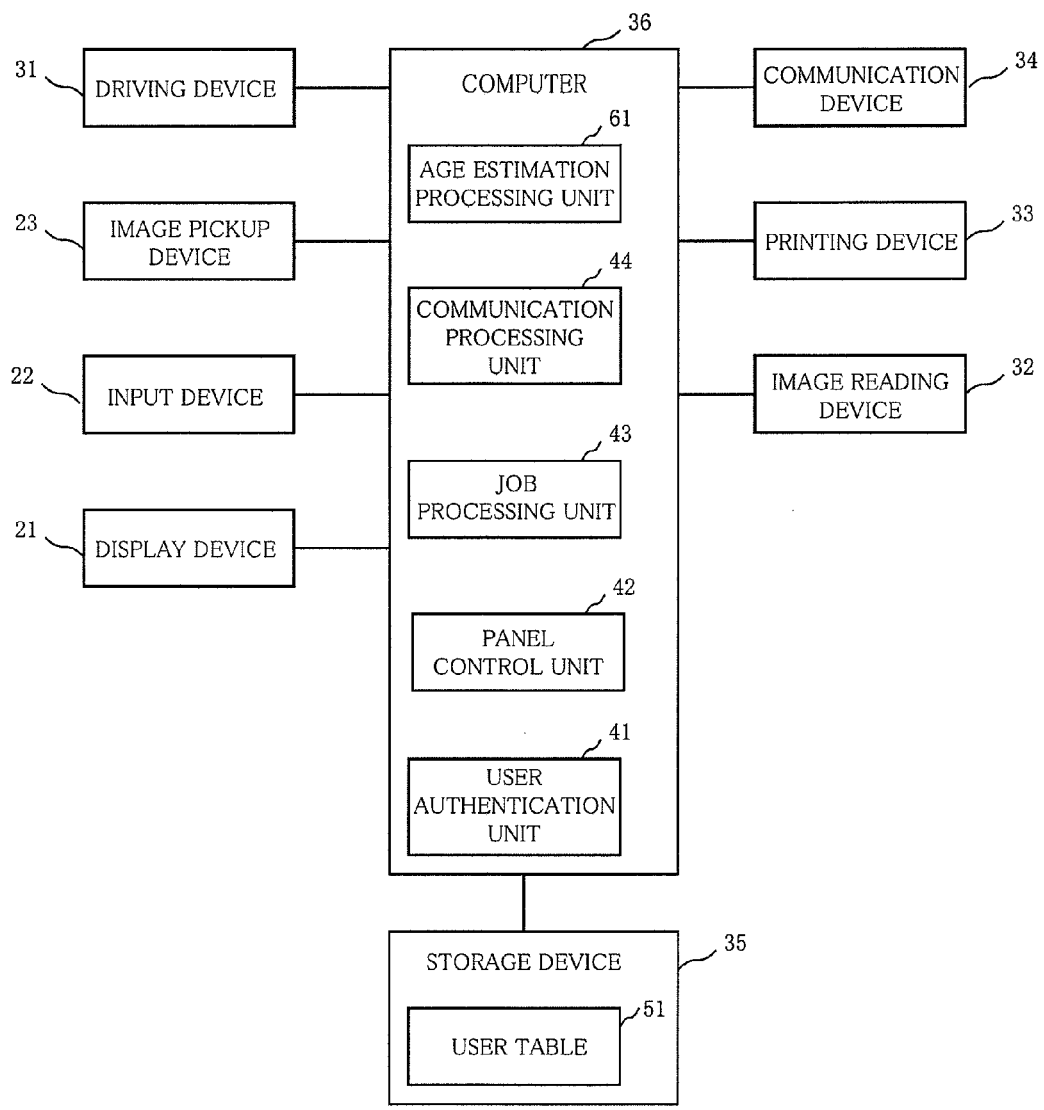
FIG. 11 illustrates a block diagram illustrating an electrical configuration of an electronic apparatus according to a fourth embodiment.

FIG. 11 depicts a block diagram illustrating a configuration of the electronic apparatus according to some embodiments. In this embodiment, computer 36 includes age estimation processing unit 61. In some embodiments, the CPU (not shown) may function as age estimation processing unit 61 by the execution of the program. The program utilized for the estimation processing may be stored. For example, the program may be stored in the read-only memory "ROM" (not shown).

The age estimation processing unit may estimate the age of the user based on the image data on the facial image. The age estimation based on the facial image may utilize known technologies, for example, technologies disclosed in Japanese Patent Application Laid-Open No. 2007-280291 and the like can be used. Japanese Patent Application Laid-Open No. 2007-280291 is hereby incorporated by reference in its entirety.

In some embodiments, the panel control unit has a function of registering estimated age data in the user table along with the reasonable inclination angle data in association with the user identification information.

Figure 12:
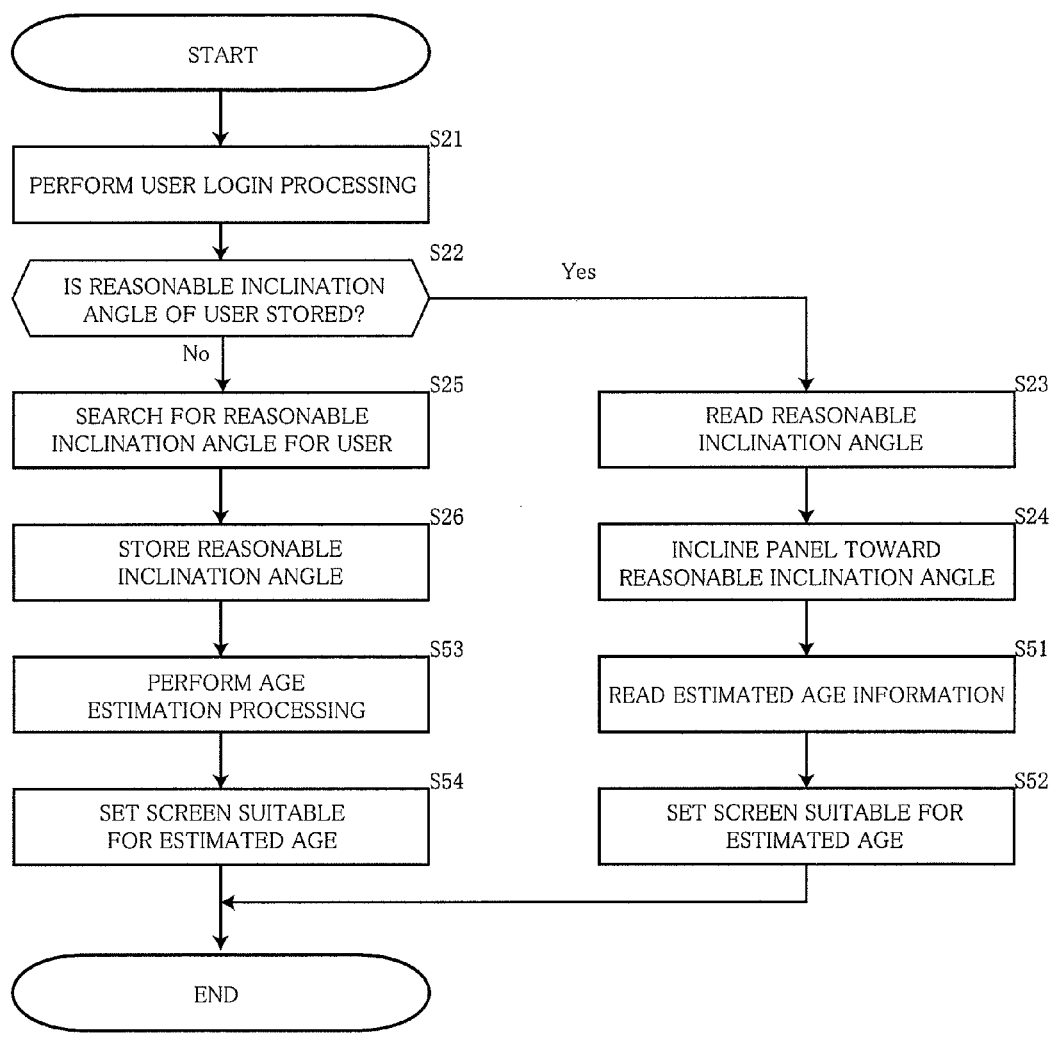
FIG. 12 illustrates a flowchart for describing an operation of the electronic apparatus illustrated in FIG. 10.

FIG. 12 depicts a flowchart for describing the operation, according to some embodiments, of the electronic apparatus illustrated in FIG. 11.

As illustrated in FIG. 12, when the user identification information is input into input device 22 by the user in some embodiments, user authentication unit 41 references user table 51 to determine whether or not to permit the user to log in (Step S21). When the user is permitted to log in, panel control unit 42 determines whether or not reasonable inclination angle data is registered in user table 51 for the logged-in user (Step S22). When the reasonable inclination angle for the logged-in user is registered in the user table, the panel control unit may set the inclination angle B of the operation panel (Steps S23 and S24). Subsequently, the panel control unit may read the estimated age data associated with the logged-in user from the user table (Step S51). After that, the panel control unit may set the screen to be displayed on the display device so as to correspond to the estimated age (Step S52).

As illustrated in FIG. 12, when the reasonable inclination angle for the logged-in user is not registered in the user table, the panel control unit may measure the reasonable inclination angle for the logged-in user (Step S25). Subsequently, the panel control unit may register the reasonable inclination angle data in the user table (Step S26). After that, the age estimation processing unit may extract the facial image data from the image data generated by the image pickup device, and may estimate the age of the user based on the facial image data. The panel control unit may register the estimated age data containing the estimated age in the user table in association with the user identification information (Step S53).

After that, the panel control unit sets the screen to be displayed on the display device so as to correspond to the estimated age (Step S54).

For example, in Steps S52 and S54, the panel control unit may enlarge a character size of a text displayed on the screen when the estimated age of the logged-in user is above a first threshold value (e.g., 60 years old), and/or when the estimated age of the logged-in user is below a second threshold value (e.g., 10 years old). Further, for example, in Steps S52 and S54, when the estimated age of the logged-in user is below the second threshold value (e.g., 10 years old), the panel control unit may utilize alternate characters on the display. For example, the panel control unit may utilize pictures rather than words to display on the screen. Some embodiments may convert words to more easily understandable text. For example, a panel control unit may convert a kanji character included in the text into a hiragana character (or katakana character or kanji character with its pronunciation in kana character) before displaying the screen.

As described above, the electronic apparatus may include, but is not limited to an age estimation processing unit that estimates the age of the user based on the image data on the facial image. The operation panel may include the display device. The age estimation processing unit estimates the age of the user based on the image data from the facial image taken when the facial image is positioned at a predetermined location. The panel control unit may cause the display device to display thereon the screen corresponding to the estimated age of the user obtained by the age estimation processing unit.

Accordingly, by using the facial image picked up upon the measurement of the reasonable inclination angle of the operation panel, it is possible to set a display screen so as to suit the age of the user.

In some embodiments, the inclination angle B of the operation panel may be adjusted so that a position of an eye of the user becomes the center or proximate the center of the image obtained by the image pickup device.

In some embodiments, the panel control unit may detect the eye from the facial image of the user. The panel control unit may include utilizing Steps S7 to S11 of FIG. 6 with the position of the eye being used as the position of the facial image to change the inclination angle B of the operation panel from the reasonable inclination.

In some embodiments, even if the position of the eye changes depending upon the height of the user, it may be possible to adjust the inclination angle B of the operation panel according to the position of the eye of the user. Here, optical axis N is inclined by the predetermined angle A from the direction perpendicular to the operation panel toward the front of the operation panel, and hence the inclination angle B is set smaller than when the optical axis N extends in the direction perpendicular to the operation panel. In other words, the operation panel may be adjusted to be placed toward a slightly upper direction than such an inclination angle B that the operation panel is placed perpendicularly to a line of sight of the user. In some embodiments, it may be possible to automatically set the operation panel at the inclination angle B suitable for the user to operate the input device.

In an embodiment, an electronic apparatus may cause the driving device to pivot the operation panel by the predetermined angle A toward such a direction as to place the operation panel further in a face-to-face relationship with the user starting from a state in which the position of the eye of the user is the center of the image obtained by the image pickup device or the vicinity thereof.

The panel control unit may detect the eye from the facial image of the user. In some embodiments, the panel control unit may include utilizing Steps S7 to S11 of FIG. 6 with the position of the eye being set as the position of the facial image used to change the inclination angle B of the operation panel from the reasonable inclination angle. In an embodiment, the panel control unit may control the driving device to pivot the operation panel by the predetermined angle A. In some embodiments, the operational panel may be moved to a position where the operational panel is positioned opposite the face of the user. For example, the operational panel may be moved such that the operational panel is face-to-face with the face of the user. In some embodiments, this may include moving the operation panel in a manner such that the inclination angle B of the operation panel increases.

In some embodiments, the above-mentioned processing may be performed after the processing illustrated in FIG. 6, 9, 10, or 12.

In an embodiment, even if the position of the eye changes depending upon the height of the user, it may be possible to adjust the inclination angle B of the operation panel according to the position of the eye of the user. Here, the optical axis N is inclined by the predetermined angle A from the direction perpendicular to the operation panel toward the front of the operation panel, but the inclination angle B may be set having the optical axis N extend in the direction perpendicular to the operation panel. Further, the operation panel is placed at such an inclination angle B that the operation panel is placed perpendicularly to the line of sight of the user. Accordingly, in some embodiments it may be possible to automatically set the operation panel at the inclination angle B suitable for the user to visually recognize the display device. In some embodiments, the operational panel may be combined with voice input and/or finger input. For example, an embodiment may include voice input in response to the display panel.

As shown in FIG. 3, pivotal shaft 11a of operation panel 11 may be positioned in an end portion of a back side of operation panel 11. As depicted in FIG. 13A, some embodiments may include positioning pivotal shaft 11a proximate a front side of operation panel 11. For example, pivotal shaft 11a may be positioned in an end portion of the front side of the operation panel 11 as is depicted in FIG. 13A. In an embodiment, as illustrated in FIG. 13B, pivotal shaft 11a may be positioned in arm member 11b. Arm member 11b may extend from operation panel 11.

Figure 13:
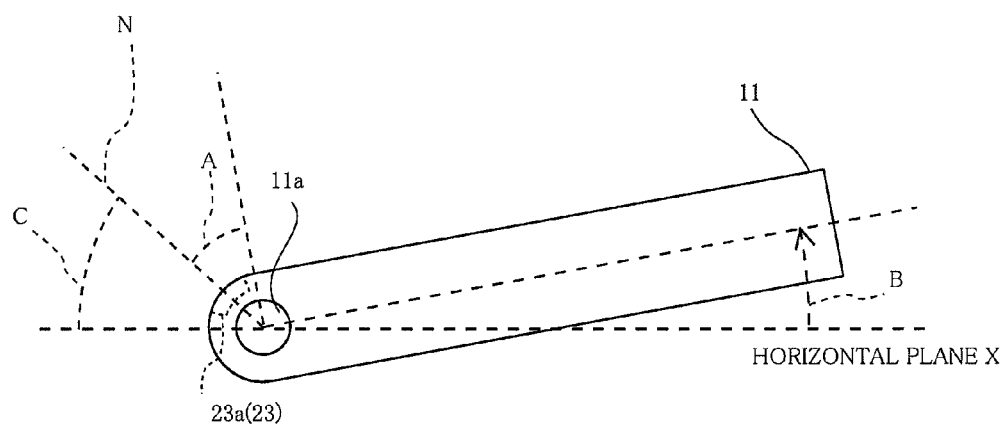
FIGS. 13A and 13B illustrate other examples of the operation panel.
Figure 13:
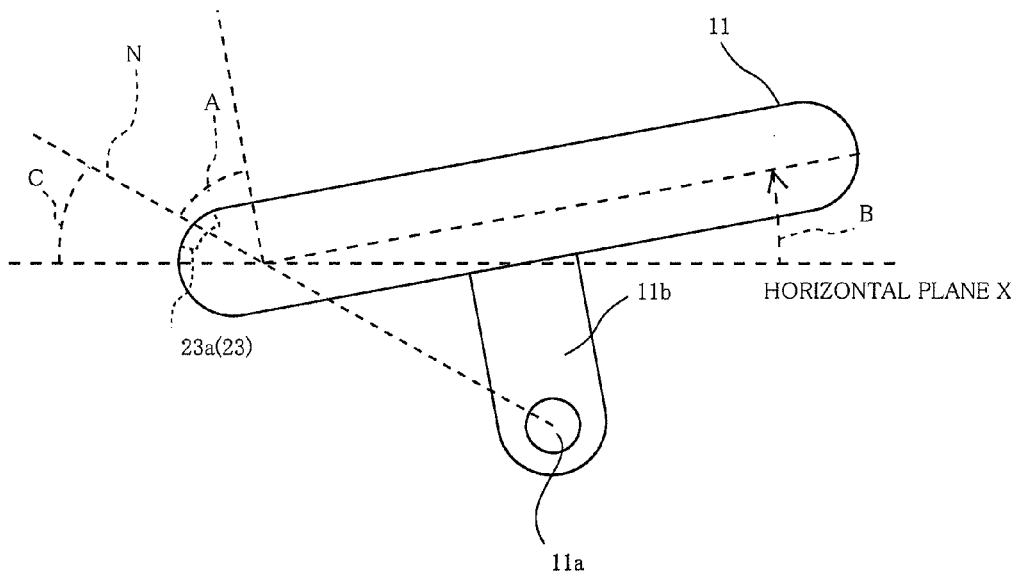

In some embodiments, an image pickup device may be positioned proximate a front side of the operational panel. For example, the image pickup device may be positioned such that it is on the side of the operational panel proximate a user. As is illustrated in FIGS. 13A and 13B, image pickup device 23 is provided at an end portion of the front side of operation panel 11. Similar to the configuration depicted in FIG. 3, FIG. 13 depicts the optical axis N of optical system 23a of image pickup device 23 inclined by a predetermined angle A. The predetermined angle A may be measured from a plane perpendicular to the surface of operation panel 11 toward the front of operation panel 11.

In some embodiments an electronic apparatus may include, but are not limited to any electronic apparatus having an operation panel, such as a vending machine, a console for an entrance/exit system, an automatic teller machine, a terminal apparatus for an emigration/immigration management system, an image forming apparatus, a fax machine, or any other apparatus utilizing an operational panel. Image forming apparatus may include, but is not limited to a copier, a printer, and/or a multifunction peripheral.

In some embodiments, the position of the facial image may be represented by a predetermined representative point on the face. For example, predetermined representative point may be a position of the nose, a barycenter of an outline of the facial image, a midpoint of the outline of the facial image, a bottom of the outline of the facial image, a position of the eye within the facial image, and/or any distinguishing feature on the face.

In some embodiments, an electronic apparatus may utilize one or more of the functions described herein. For example, a system may not utilize the login process. In some embodiments, the electronic apparatus does not have the user table. In an embodiment, each time the user uses the electronic apparatus, the electronic apparatus may measure and set the reasonable inclination angle. Some embodiments of electronic apparatus may perform an age estimation processing based on the facial image data. Accordingly, the electronic apparatus may be applied to a kiosk terminal and the like.

Thus, some embodiments may allow for the electronic apparatus to be used by an indefinite and large number of users.

In some embodiments not requiring login processing, the electronic apparatus may include a human-sensitive sensor such as a thermal sensor and an infrared sensor so as to start the above-mentioned processing when the user existing in front of the operation panel is detected by the human-sensitive sensor.

An embodiment of an electronic apparatus may include storing the user table on the electronic apparatus. Some embodiments may allow the user table to be stored on a server. When the user table is stored on the server, the communication processing unit may control the communication device to access the server, and each processing unit may use the communication processing unit to execute reading/writing of data from/to the user table on the server.

In some embodiments, when an illegal copy is detected, the job processing unit may communicate with an administrator to report an illegal copy, any data pertaining to the user and/or other relevant information. For example, the job processing unit may use the communication processing unit to transmit, to a predetermined administrator, identification information of the electronic apparatus, a message indicating the occurrence of an illegal copy, the facial image data on the user, and other such information.

An embodiment of an electronic apparatus may include an operation panel, a driving device, an image pickup device, a face detection unit, and/or a control unit.

In some embodiments, an operation panel may be configured to move. The driving device may be configured to move the operation panel. Various embodiments of an image pickup device may be configured to be proximate to (e.g., installed on or in or otherwise coupled to, or adjacent to) the operation panel, and to capture an image of a user. In some embodiments, a face detection unit may be configured to detect a position of a facial image of a user within the image captured by the image pickup device. In an embodiment of an electronic apparatus, a control unit may be configured to control the driving device such that the operation panel and an optical axis of the image pickup device move. The control unit may control the driving device based on the position of the facial image detected by the face detecting unit.

In an embodiment, an operation panel may be configured to allow an inclination of the operation panel to change.

In an embodiment, a driving device may be configured to change the inclination angle of the operation panel.

In an embodiment, a control unit may be configured to allow the driving device to pivot the operation panel and the optical axis of the image pickup device.

In some embodiments, the inclination angle of an operation panel may be adjusted automatically. For example, even if the position of the face changes depending upon the height of the user, by adjusting the inclination angle of the operation panel according to the position of the face of the user, it is possible to automatically set the operation panel at the inclination angle suitable for the user.

In an embodiment, an image pickup device may be configured to be installed on the operation panel. An optical axis of the image pickup device may exist in a radial direction about a pivotal shaft of the operation panel.

In some embodiments, while the optical axis rotates about the pivotal shaft of the operation panel a distance between the user and the image pickup device may vary. However, a change in the distance between the user and the image pickup device may become small upon the adjustment of the inclination angle B. In other words, the size of the facial image of the user obtained by the image pickup device is hardly changed. Therefore, it is easy to detect the facial image of the user within the image obtained by the image pickup device.

In additional embodiments, the image pickup device may be configured to be installed on the operation panel so that the optical axis of the image pickup device is inclined by a predetermined angle from a direction perpendicular to a surface of the operation panel proximate a front of the operation panel. For example, the optical axis of the image pickup device may be inclined by a predetermined angle from a direction perpendicular to a surface of the operation panel such that the operation panel tilts toward the user.

In some embodiments, when the face of the user exists in front of the image pickup device, it is possible to place the operation panel at such an inclination angle as to facilitate the image capture. Therefore, the face of the user hardly deviates from the angle of view of the image pickup device upon the adjustment of the inclination angle.

In additional embodiments, the control unit may be configured to control the driving device such that the operation panel is moved until the position of the facial image falls within a predetermined location within the image picked up by the image pickup device.

Some embodiments of an electronic apparatus may include a user authentication unit configured to perform a user authentication based on user identification information upon login. In an embodiment, the control unit may be configured to store user identification information. For example, during the login of the user, the inclination angle may be stored with the user identification information of the user in a storage device. The information stored may be taken when the facial image is positioned within the predetermined location. Thus, upon the next login of the user, the operation panel may be moved to the inclination angle based on the stored control information.

In an embodiment, when a reasonable inclination angle has been measured, the operation panel may be placed at the inclination angle, and hence it is possible to place the operation panel at the inclination angle suitable for the logged-in user in a short period of time.

Some embodiments of electronic apparatus may include an image reading device, a printing device, and a copy processing unit. The image reading device may be configured to read an original image, and to generate image data. The printing device may be configured to print an image based on print data. The copy processing unit may be configured to generate the print data from the image data generated by the image reading device, to cause the printing device to print the original image based on the print data, and to determine based on the image data whether or not a copy of an original is an illegal copy. In some embodiments, the control unit may be configured to store the image data in the storage device relating to the facial image captured when the facial image is positioned within the image picked up by the image pickup device at the predetermined location. When it is determined that the copy of the original is the illegal copy, the copy processing unit may be configured to cause the printing unit to print an image based on the stored image data. For example, a facial image based on the stored image data on the facial image may be printed. In addition, some embodiments may print a copy of the original along with an image captured by the image pickup device at the time of the illegal copy.

Accordingly, it is possible to suppress the occurrence of an illegal copy. Further, by using the facial image picked up upon the detection of the reasonable inclination angle of the operation panel, it is possible to identify the user who has executed the illegal copy. In some embodiments, the facial image of the user picked up upon the measurement of the reasonable inclination angle is used, and hence the facial image of the user can be printed even if the face of the user deviates from the angle of view of the image pickup device upon the execution of the illegal copy.

Some embodiments of an electronic apparatus may comprise an age estimation unit configured to estimate an age of the user based on image data from the facial image. Further, the operation panel may comprise a display device. An age estimation unit may be configured to estimate the age of the user based on the image data from the facial image. The image data of the facial image may have been captured when the face was positioned in a predetermined location. In some embodiments, a control unit may be configured to cause the display device to display thereon a screen corresponding to the estimated age of the user obtained by the age estimation unit.

Thus, in some embodiments the facial image may be used to set an inclination angle of the operation panel, as well as the configuration of the display screen. For example, the font, language, and/or drawings on the display panel may be altered to predetermined settings of a user.

In some embodiments, the control unit may be configured to enlarge a character size of a text within the screen when the estimated age is above a first threshold value, and/or when the estimated age is below a second threshold value.

Thus, it is possible to make it easy for an elderly user or a child user to read a character within the operation panel.

In some embodiments, the predetermined location may be one of a center of the image picked up by the image pickup device along a pivotal direction of the operation panel and a vicinity of the center.

In some embodiments, it may be easy to include the facial image of the user within the angle of view of the image pickup device, which in turn makes it easy to detect the facial image of the user.

In an embodiment, the face detection unit may be configured to detect a position of an eye within the facial image within the image captured by the image pickup device. The control unit may control the driving device to pivot the operation panel until the position of the facial image within the image picked up by the image pickup device becomes the predetermined location, the control unit may be configured to cause the driving device to pivot the operation panel so that the position of the eye is one of a center of the image picked up by the image pickup device along a pivotal direction of the operation panel and a vicinity of the center.

In an embodiment, once the facial image of the user is detected, it is possible to place the operation panel at such an inclination angle as to make operation easiest. Some embodiments may include detecting the facial image of the user, and then placing the operation panel at such an inclination angle as to make it easiest for the user to view display contents on the operation panel.

An embodiment may include a face detection unit configured to detect a position of an eye within the facial image within the image captured by the image pickup device. In some embodiments, the control unit may control the driving device such that the operation panel pivots by the predetermined angle toward a user. In an embodiment, the control unit may control the driving device such that the operation panel moves from a state in which the eye is positioned at a center of the image captured by the image pickup device along a pivotal direction of the operation panel and a vicinity of the center. An embodiment may include positioning the operation panel such that the operation panel faces the user.

In an embodiment, an electronic apparatus may include a storage device configured to store at least one facial image dataset and a predetermined setting dataset associated with the at least one facial image data set. The predetermined setting dataset may include a language setting.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Having thus described in detail embodiments of the present invention, it is to be understood that the invention defined by the foregoing paragraphs is not to be limited to particular details and/or embodiments set forth in the above description, as many apparent variations thereof are possible without departing from the spirit or scope of the present invention.

What is claimed is:

1. An electronic apparatus, comprising:
an operation panel configured to move;
a driving device configured to move the operation panel;
an image pickup device configured to be installed proximate the operation panel, and to capture an image of a user;
a face detection unit configured to detect a position of a facial image of the user within the image captured by the image pickup device;
a control unit configured to control the driving device such that the operation panel and an optical axis of the image pickup device move according to the position of the facial image detected by the face detection unit;
an image reading device configured to read an original image and to generate image data;
a printing device configured to print an image based on print data; and
a copy processing unit configured to generate the print data from the image data generated by the image reading device, to cause the printing device to print the original image based on the print data, and to determine based on the image data whether or not a copy of an original is an illegal copy, wherein:
the control unit is configured to control the driving device such that the operation panel moves until the facial image is positioned within the image picked up by the image pickup device at a predetermined location;
the control unit is configured to store the image data in a storage device relating to the facial image captured when the facial image is positioned within the image picked up by the image pickup device at the predetermined location; and
when it is determined that the copy of the original is the illegal copy, the copy processing unit is configured to cause the printing device to print the facial image along with the original image based on the stored image data on the facial image.

2. The electronic apparatus according to claim 1, wherein the operation panel is configured to allow an inclination angle of the operation panel to change.

3. The electronic apparatus according to claim 2, wherein the driving device is configured to change the inclination angle of the operation panel.

4. The electronic apparatus according to claim 1, wherein the image pickup device configured to be installed on the operation panel.

5. The electronic apparatus according to claim 1, wherein the control unit is configured to allow the driving device to pivot the operation panel and the optical axis of the image pickup device.

6. The electronic apparatus according to claim 1, wherein the image pickup device is configured to be installed on the operation panel so that the optical axis of the image pickup device exists in a radial direction about a pivotal shaft of the operation panel.

7. The electronic apparatus according to claim 1, wherein the image pickup device is configured to be installed on the operation panel so that the optical axis of the image pickup device is inclined by a predetermined angle from a direction perpendicular to a surface of the operation panel proximate a front of the operation panel.

8. The electronic apparatus according to claim 7, wherein:
the face detection unit is configured to detect a position of an eye within the facial image within the image captured by the image pickup device; and
the control unit is configured to control the driving device to pivot the operation panel by the predetermined angle toward such a direction as to further realize a face-to-face relationship with the user starting from a state in which the position of the eye is one of a center of the image picked up by the image pickup device along a pivotal direction of the operation panel and a vicinity of the center.

9. The electronic apparatus according to claim 1, further comprising a user authentication unit configured to perform a user authentication based on user identification information upon login,
wherein the control unit is configured to store, during the login of the user, the inclination angle as control information in association with the user identification information on the user in a storage device relating to a time when the facial image is positioned at the predetermined location, and to set, upon next login of the user, the operation panel at the inclination angle based on the stored control information.

10. The electronic apparatus according to claim 1, further comprising an age estimation unit configured to estimate an age of the user based on image data from the facial image, wherein:
the operation panel comprises a display device;
the age estimation unit is configured to estimate an age of the user based on the image data from the facial image taken when the facial image is positioned at the predetermined location; and
the control unit is configured to cause the display device to display thereon a screen corresponding to the estimated age of the user obtained by the age estimation unit.

11. The electronic apparatus according to claim 10, wherein the control unit is configured to enlarge a character size of a text within the screen when the estimated age is above a first threshold value, and/or when the estimated age is below a second threshold value.

12. The electronic apparatus according to claim 1, wherein the predetermined location is one of a center of the image picked up by the image pickup device along a pivotal direction of the operation panel and a vicinity of the center.

13. The electronic apparatus according to claim 1, wherein:
the face detection unit is configured to detect a position of an eye within the facial image within the image picked up by the image pickup device; and
after the control unit controls the driving device to pivot the operation panel until the position of the facial image within the image picked up by the image pickup device becomes the predetermined location, the control unit is configured to cause the driving device to pivot the operation panel so that the position of the eye is one of a center of the image picked up by the image pickup device along a pivotal direction of the operation panel and a vicinity of the center.

14. The electronic apparatus according to claim 1, wherein:
the face detection unit is configured to detect a position of an eye within the facial image within the image captured by the image pickup device; and
after the control unit controls the driving device to pivot the operation panel until the position of the facial image within the image picked up by the image pickup device becomes the predetermined location, the control unit is configured to cause the driving device to pivot the operation panel by a predetermined angle toward such a direction as to further realize a face-to-face relationship with the user starting from a state in which the position of the eye is one of a center of the image picked up by the image pickup device along a pivotal direction of the operation panel and a vicinity of the center.

15. The electronic apparatus according to claim 1, further comprising a storage device configured to store at least one facial image dataset and a predetermined setting dataset associated with the at least one facial image dataset.

16. The electronic apparatus according to claim 15, wherein the predetermined setting dataset comprises a language setting.

* * * * *